United States Patent [19]

Ikeda et al.

[11] Patent Number: 4,796,061
[45] Date of Patent: Jan. 3, 1989

[54] DEVICE FOR DETACHABLY ATTACHING A FILM ONTO A DRUM IN A DRUM TYPE PICTURE SCANNING RECORDING APPARATUS

[75] Inventors: Masahide Ikeda; Hitomi Atoji, both of Kyoto; Takashi Ōhara, Shiga; Yuuzi Mizuno, Kyoto, all of Japan

[73] Assignee: Dainippon Screen Mfg. Co., Ltd., Kyoto, Japan

[21] Appl. No.: 930,800

[22] Filed: Nov. 13, 1986

[30] Foreign Application Priority Data

Nov. 16, 1985 [JP] Japan ................................ 60-255834

[51] Int. Cl.⁴ .............................................. G03B 27/60
[52] U.S. Cl. .......................................... 355/73; 355/47
[58] Field of Search ........................ 355/72, 73, 76, 47

[56] References Cited

U.S. PATENT DOCUMENTS

| | | | |
|---|---|---|---|
| 4,017,181 | 4/1977 | Kamaba et al. | 355/72 |
| 4,087,178 | 5/1978 | Pfeifer et al. | 355/72 |
| 4,621,272 | 11/1986 | Toriumi et al. | 355/72 |
| 4,637,710 | 1/1987 | Fujii et al. | 355/72 |

Primary Examiner—Monroe H. Hayes
Attorney, Agent, or Firm—Zarley McKee, Thomte, Voorhees & Sease

[57] ABSTRACT

A film applying and removing device in a drum type picture scanning recording apparatus is adapted that a photosensitive film is wound onto a rotary drum to be scanned by an exposing head, and comprises a first tray for accommodating a plurality of unexposed films, a film ascending and descending means for ascending the tip end of the film in the tray to contact it with the surface of the drum, a vacuum suctioning means to hold the tip end on the surface of the drum, an inversely rotatable driving means to rotate the drum and guide means for introducing a second tray for receiving exposed films.

9 Claims, 5 Drawing Sheets

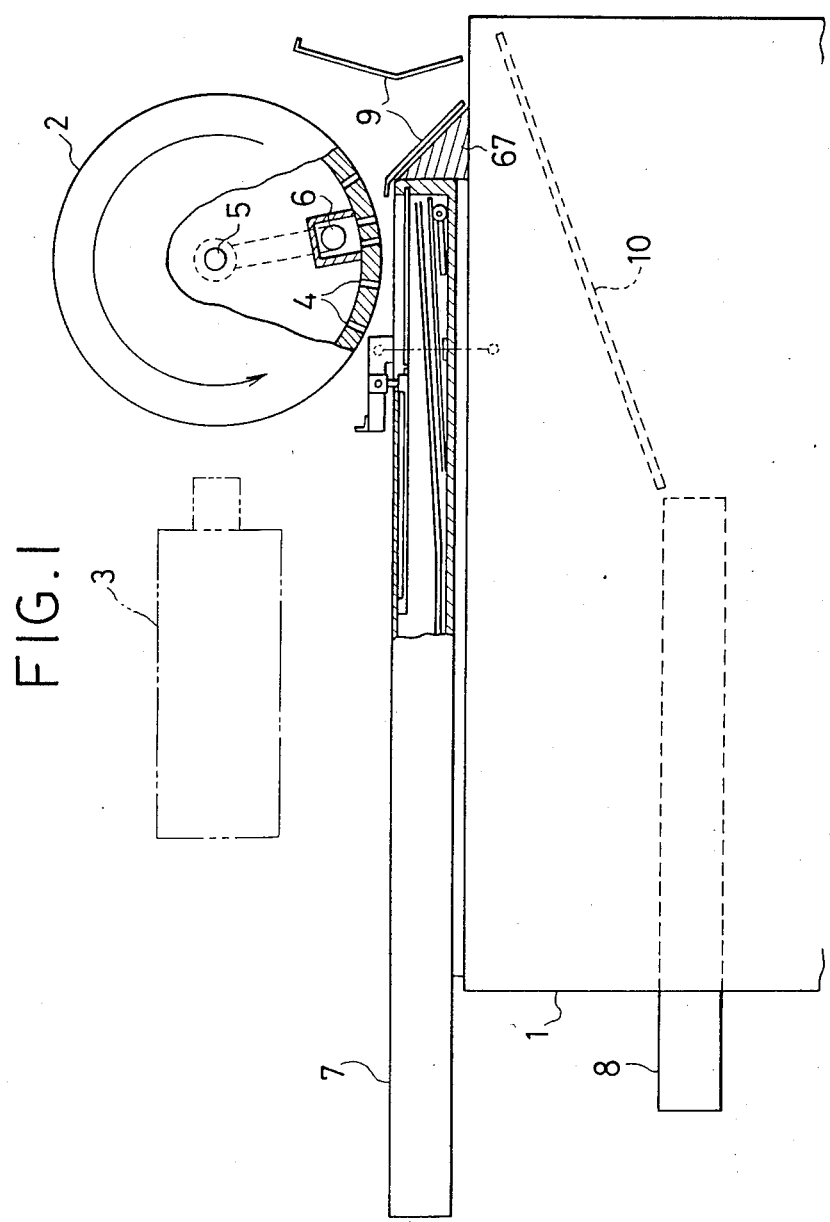
FIG. I

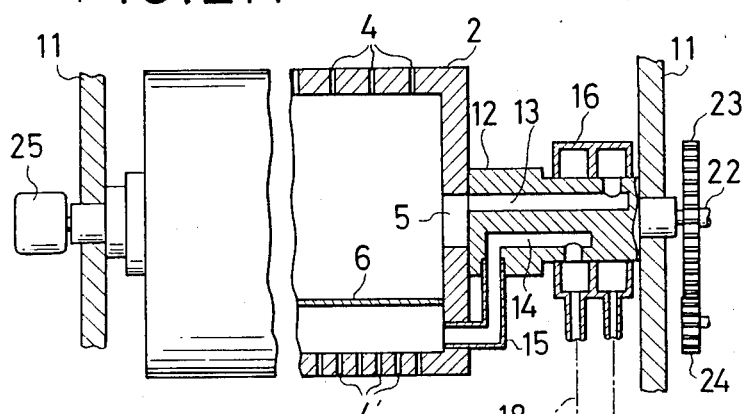
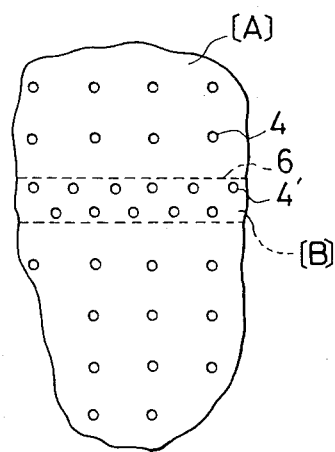
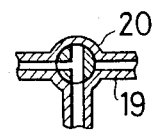
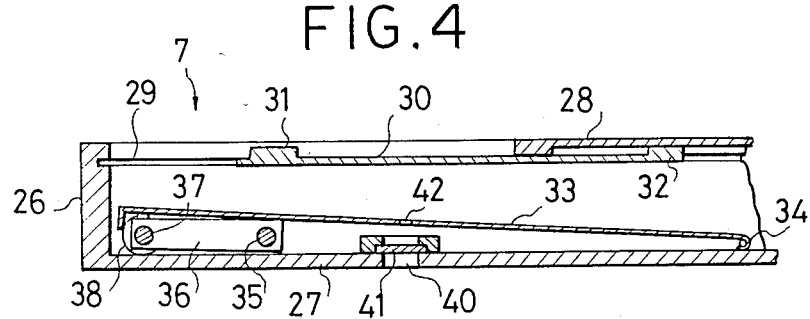

DEVICE FOR DETACHABLY ATTACHING A FILM ONTO A DRUM IN A DRUM TYPE PICTURE SCANNING RECORDING APPARATUS

BACKGROUND OF THE INVENTION

The present invention relates to a drum type picture scanning recording apparatus such as color scanner for plate-making etc. in which a picture recording film is wound on a rotary drum to be scanned and exposed, particularly to a device for detachably attaching a film onto a rotary drum and removing it therefrom after scanning has been finished.

Conventionally, operation for attaching and/or removing a film to or recording from in a picture scanning recording apparatus has been manually carried out. This is accomplished by removing the cover of the apparatus under the illumination of a safety light to take a picture film from the case. One end of the picture film is inserted into a clip of the recording drum to be secured thereto. In the case of a drum of the vacuum absorbing type, the film is secured thereto by operating the vacuum source therefor. By rotating the drum at low speed, the picture film is wound onto the outer circumference of the drum. However, this process is troublesome and inefficient, and must be conducted with difficulty in a darkroom.

For the purpose of improving the afore-mentioned problems, for example, there is the Japanese Pat. Publication No. 52-42086 titled "An apparatus for automatically attaching and detaching a photofilm material". In the publication there is disclosed an apparatus in which a photosensitive film being accommodated in a particularly constructed cassette is fed to a recording drum to be applied thereto, and after having been exposed, the film is separated from the recording drum so that it may be accommodated into the cassette.

In the apparatus disclosed in the afore-mentioned publication, the photosensitive film can be automatically applied to and/or detached from the recording drum. However, only one sheet of film can be accommodated in the cassette. This creates a troublesome problem in that persons conducting this operation must bring a cassette into the darkroom, take out the exposed film from the cassette, and then load an unexposed film into the cassette. Of course, by preparing a plurality of cassettes, one of them can be used to be scanned and recorded, while the other exposed cassette films are replaced with unexposed ones. This alleviates the afore-mentioned problems to some extent. However, even under such circumstances, every sheet of film cassettes must be exchanged to load and/or remove the films. It is important that this operation be conducted as quickly as possible.

The above-described apparatus requires that rollers feed the film to the surface of the drum and the driving means therefor. This results in complexity of construction, high cost for the equipment, and invites maintenance difficulties.

SUMMARY OF THE INVENTION

The main object of the present invention is to provide an apparatus which can feed plural sheets of film to the recording drum and apply and/or remove them in orderly fashion from the recording drum.

The present invention involves a plurality of unexposed photosensitive films stacked on a tray. The tray is positioned in the lower part of a drum of the vacuum suctioning type. By pushing up the bottom plate (or an ascending and descending plate hingedly fixed to the bottom plate) of the tray, one edge of a film placed on the top of the stack of the films in the tray may be contacted with the drum to be suctionedly secured. The remaining films are similarly deposited on the drum by descending the bottom plates. The drum is rotated at a low speed to wind the film onto the outer circumference thereof.

To remove the film from the drum, the vacuum suctioning force of the drum is released, and the drum is rotated in the inverse direction of the previous direction of rotation. The film droops down from the rear end thereof because of its own weight, and the exposed films are fed to a second tray for accommodating the exposed films by a guide. To carry out this operation, the vacuum suctioning force is divided into two zones. One zone holds only the tip end of the film and the other zone holds the remaining body of the film, and the two zones are controlled appropriately by a switching valve.

Other features and advantages of the invention will be apparent from the following description taken in connection with the accompanying drawings.

BRIEF DESCRIPTION OF THE DRAWINGS

FIG. 1 is a partially broken side view showing main parts of an apparatus of one of embodiments in which the present invention is applied to a color scanner for plate making;

FIG. 2A and 2B are a partially broken elevation view showing construction of a recording drum of the apparatus shown in FIG. 1;

FIG. 3 is a view showing a vacuum suctioning zone of the recording drum;

FIG. 4 is a side sectional view showing main parts of a tray for accommodating unexposed films;

DETAILED DESCRIPTION OF PREFERRED EMBODIMENTS

Figure 5:
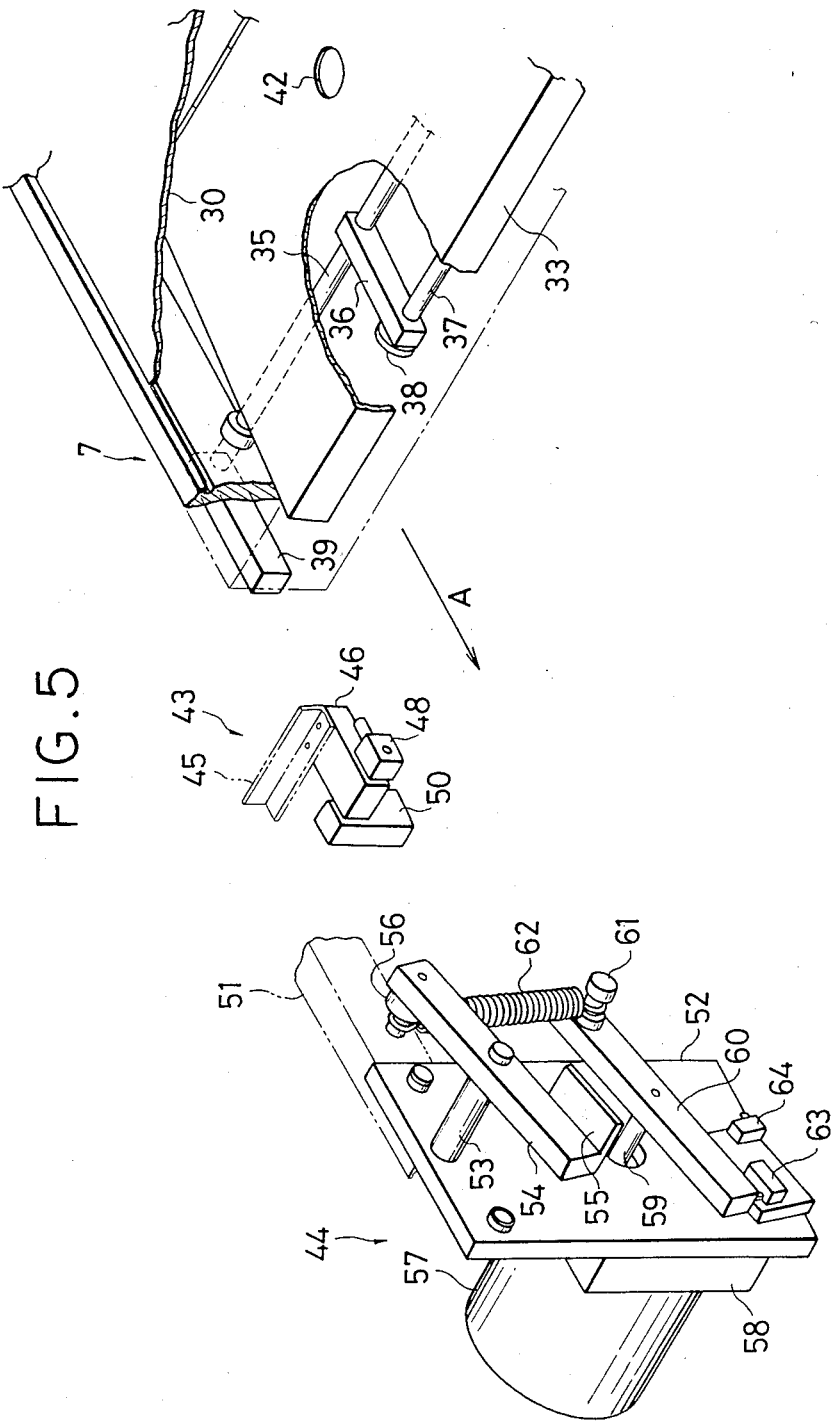
FIG. 5 is a perspective view showing the tray, a sliding lid opening and closing device and a film ascending and descending device.

FIG. 1 is a partially broken side view showing main parts of a plate-making color scanner which is one of embodiments of the present invention. On the upper part of a frame 1, a recording drum 2 is pivotally supported by a horizontally disposed central axis so that it may be rotated about the axis, and an exposing head 3 shown with two dots lines in FIG. 1 is mounted so as to be shiftable in the axial direction of the drum 2. Thus, a film wound on the drum 2 is scanned and exposed basing on picture image signals sent from a layout scanner system etc. to record a reproduced picture image thereon. The recording drum 2, the exposing head 3 etc. are covered with light shielding covers (not shown), so that it is possible to prevent the film which is being exposed from being exposed by external lights. Thus, operating in a light room can be performed.

The drum 2 is a hollow tubular shape, and on the circumference of the drum 2 there are a plurality of narrow holes 4 are bored, and a suctioning passage (which will be described hereinafter and which is provided as the part of rotational axis) is communicated with a vacuum source to suction the air from each of the narrow holes 4 for holding the film wound on the circumferential surface. In addition, the suctioning region of the drum 2 is divided into two zones by an air-tightly sealed partition 6.

On the upper surface of the frame 1, a first tray 7 for accommodating unexposed films is disposed, and a second tray 8 for receiving exposed films is installed. The two trays 7 and 8 are installed on positions shown in the drawing along respective a pair of guides (not shown) from each of the front operation sides. Then, the tray 7 is positioned by contacting stopper 67. The films in the tray 7 are positioned by each of contact members (not shown) which contacts each of sides of the films, so that a positional relation with the film and the drum 2 is always maintained constant. Further, on the upper surface of the rear part of the frame 1 and in the inner side thereof, there are provided two guide plates 9 and 10 which guide the exposed films to the second tray 8, respectively.

In a device of the embodiment of this invention it is adapted that a plurality of the unexposed films accommodated in overlapped manner in the first tray 7, and one sheet of the unexposed film is taken out in order from the uppermost part of pile of the unexposed films to wind it on the outer surface of the circumference of the drum 2. After exposure scanning has been finished, the exposed films are automatically accommodated in the second tray 8 through the guides 9 and 10.

FIG. 2 is a partially broken elevation view showing the drum 2 and a switching means for switching the suctioning zones. The drum 2 has, as described above, a hollow tubular shape with the partition 6 providing an air-tight seal in the inside of the drum 2. As shown in FIG. 3, the suctioning region is partitioned into two zones [A] and [B]. Zone [B] is a relatively small area at which the tip end of the film is to be suctioned. Zone [A] is the other portion to be suctioned. Suctioning holes 4 and 4' of the zones have the same diameter, but the space between the suctioning holes in the bracket [B] zone brackets is smaller than that of the holes in the [A] zone. When the film is wound on the drum, it is necesssary to hold the film only by the tip end part of it. Any desired force for holding the film can be used.

The drum 2 is rotated by being supported by a pair of bearing plates 11. At the axial part of the right side there is provided a rotary valve 12 for vacuum suctioning operation. The rotary valve 12 has two suctioning passages 13 and 14, and the passage 13 is in direct communication with a hole 5 bored on the surface of an end plate of the drum 2 to give an effect to the [A] zone. The other suctioning passage 14 is communicated with a portion partitioned by the partition 6 through a pipe 15 to operate [B] zone. Each of the two suctioning passages 13 and 14 has an opening at the outer surface of the rotary valve 12, respectively. The openings are made so that they may open at different positions in the axial direction, and around them a connector 16 is provided. The connector 16 is fixed to a body of the device, and has two chambers which correspond to the suctioning passages 13 and 14, respectively. They are rotatably and air sealed to the circumferential surface of the rotary valve 12. The two chambers are connected to a cross valve 19 through pipes 17 and 18, respectively. The cross valve 19 is that of known type, and connected with the vacuum source via a pipe 21. When a rotor 20 is at a position shown in FIG. 2, the two suctioning passages 13 and 14 are both connected to the vacuum source. In the case of the rotor 20 being at another position shown in FIG. 2-A, only the suctioning passage 14 which is to operate the [B] zone is connected to the vacuum source.

In addition, the rotational axis of the drum 2 extends outwardly towards both sides of the bearing plates 11. On an axis 22 of the driving side there are provided gear means 23 and 24 for low speed driving. They are used when the films are attached or removed. A rotary encoder 25 functions for detecting an angular position of the drum 2. The rotary encoder 25 outputs pulses of the number corresponding to an amount of rotation counted from an angular position determined as a reference. By count-controlling the pulses, the amount of rotation of the drum 2 or any position at which the drum 2 is to be stopped is controlled. That is, this rotary encoder 25 is one of the usual means in the drum type picture scanning apparatus (such as plate-making color scanner or the like), so that a detailed description is omitted.

Figure 7:
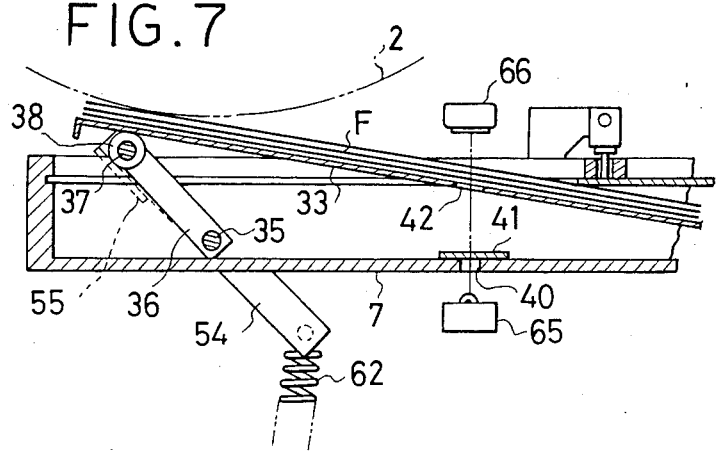
FIG. 7 is a side sectional view showing operation of the film ascending and descending device.

Next, FIG. 4 is a sectional view showing main parts of the first tray 7 for accommodating unexposed films. The body of the first tray 7 is a box composed of a side plate 26, a bottom plate 27 and a lid plate 28. The rear end part of the lid plate 28 is opened to an appropriate size, and a sliding lid 30 which performs opening and closing operation along a guide groove 29 cut on the side plate 26 is disposed in a manner of one end portion being fitted with the groove 29. On the both front and rear ends of the sliding lid 30 there are provided projecting members 31 and 32 which direct in the right and left directions, respectively, to limit the stroke of movement of the sliding lid 30. An appropriate portion of the bottom plate 27 an ascending and descending plate 33 is pivotally mounted with a hinge 34. Between the ascending and descending plate 33 and the bottom plate 37, a rotational axis 35 is bridgingly provided. On the rotational axis 35, a pair of arms 36 are provided. At the tip end of each of the arms 36, a roller axis 37 is bridgingly provided therebetween to support a pair of rollers 38. One end of the rotational axis 35 is projected, as shown in FIG. 5, to the outer surface of the first tray 7, by penetrating the side plate, and a lever 39 is secured thereto. Accordingly, when the lever 39 is turned to the upward position, the arms 36 secured to the rotational axis 35 are rotated, then the rollers 38 ascend the ascending and descending plate 33. In addition, there is a penetrating hole 40 on an appropriate position on the bottom plate 37, and to this hole an infrared rays transmitting filter 41 is disposed. On a position of the ascending and descending plate 33 corresponding to the aforementioned penetrating hole 40 there is also bored a penetrating hole 42. The hole 42 is provided for the purpose of detecting existence of the film(s) in the first tray 7, and as shown in FIG. 7. When the tray 7 is inserted into the predetermined position, a light source 60 is disposed at the lower position of the position which matches to the penetrating holes 40 and 42 of the frame. At the upper position thereof an infrared rays sensor 66 is disposed. Through each of the penetrating holes and the infrared rays filter 41, a light beam from the light source 65 is incident to the sensor 66. That is, when the film is in the tray 7, the light beam is interrupted, the sensor 66 does not output. In the case of the film in the tray 7 being used out, the light beam is incident to the sensor 66, and outputs a signal(s) to inform that the tray 7 has been empty.

Figure 6A:
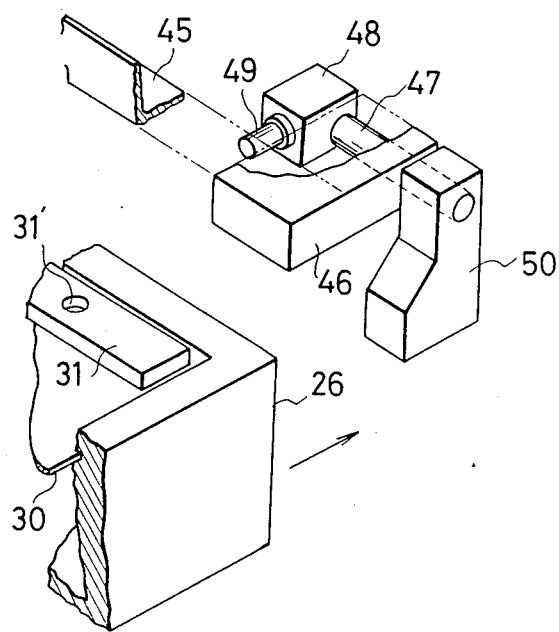
FIG. 6A and 6B perspective views showing operation of the sliding lid opening and closing device.
Figure 6B:
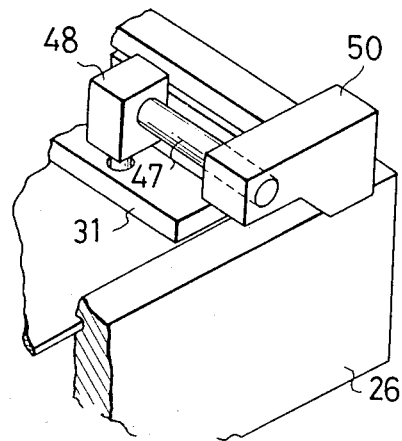

FIG. 5 is a perspective view which shows a device 42 for automatically opening and closing the sliding lid 30 basing on inserting and removing the tray 7 into and from the predetermined position of the frame 1. A device 44 is also shown which ascends and descends the ascending and descending plate 33 by engaging with the lever 33. An arrow mark [A] indicates a direction of the frame 1 into which the tray 7 is to be inserted. The sliding lid opening and closing device 43 is shown in FIG. 6 in detail in a perspective view. There are disposed a pair of these devices, and one of them is shown in FIG. 6. The device 43 is fitted as follows: A bearing 46 is secured to a constructing member 45 which is integral with the frame 1; a block 48 having a pin 49 and cam 50 are pivotally mounted to the constructing member 45 with an axis 47. The block 48 and the cam 50 are secured to the axis 47 and rotated integrally with the axis 47, and in free condition, as shown in FIG. 6(a), the pin 49 is situated horizontally. When the tray 7 is applied to the frame 1 from the front of the frame 1, the rear end thereof is contacted with a protrusion formed at the lower part of the cam 50 to push the cam upwardly which is rotated together with the block 48. A rod member 31 projects from the sliding lid 30 a pair of recessed holes 31'. Holes 31' are bored at positions corresponding to the pins 49, and according to the rotation of the block 48, each of the pins 49 is inserted into the respective recessed holes 31'. The cam 50 and the block 48 are pivoted about at an angle of 90 degrees, and when the cam 50 reaches to the upper surface of the tray 7, they do not rotate. The projecting portion of the cam 50 slidingly contacts with the upper edge of the side plate 26 to maintain the pins 49 in a downward position. Accordingly, when the tray 7 is inserted into the predetermined equipping position, the sliding lid 50 is slid to the tray body which is stopped with the pins 49 and opened. FIG. 6(B) shows the above-described state. When the tray 7 is extracted or removed from the equipping position, the sliding lid 30 is stopped by the pins 49 until the tray 7 reaches a certain position. At the position where the tray is completely closed, the cam 50 is released from the contact with the side plate 26, and rotated together with the block 48. The pins 49 are thus disengaged from the recessed holes 31' so that the tray 7 may be extracted from the position.

Referring to FIG. 5 again, the device 44 for ascending and descending the plate 33 in the tray 7 is secured to member 51 which is integrally attached to the frame 1. An axis 53 erected on a supporting plate 52 secured to member 51 is disposed at a position substantially coinciding with an axial line of the rotating axis 35 which operates the ascending and descending plate 33 when the tray 7 is inserted into the predetermined position. On axis 53, there is pivotally mounted a rocking rod 54. At one end thereof, a projecting part 55 engages the lever 39 of the tray 7 side, and at the other end thereof a pin axis 56 is provided.

Under the lower part of the supporting plate 52 a reversible motor 57 and a speed reducer 58 are provided, and on one end of a rotating rod 60 secured to an output axis 59 of the speed reducer 58 a pin axis 61 is disposed. Between the rocking rod 54 and the pin axis 56 a spring 62 is provided. In addition, at appropriate portions of the supporting plate 52 there are disposed two limit switches 63 and 64 to control the motor 57 so that rotation stroke of the rotating rod 60 may be limited.

After the tray 7 is inserted into the predetermined position, the motor 57 is started so that the rotating rod 60 may be rotated in the clockwise direction seen from the tray side. The rocking rod 54, connected with the rotating rod 60 through a spring 62, is also rotated in the same direction. By means of the rotation the projecting part 55, the lever 39 of the tray 7 rotates to ascend the ascending and descending plate 33. With the above-described operation, as shown in FIG. 7, a film which is placed at the uppermost of a pile of films overlappingly piled on the ascending and descending plate 33 is ascended up to a position at which the film is contacted with the upper drum 2.

The amount of rotation of the rotational rod 60 is limited within a certain range by the limit switches 63 and 64. The angle within which the rocking rod 54 is rotated varies in each instance because of the number of films being accommodated in the tray 7. The spring 62 is disposed so that the angular difference may be adjusted.

Figure 8:
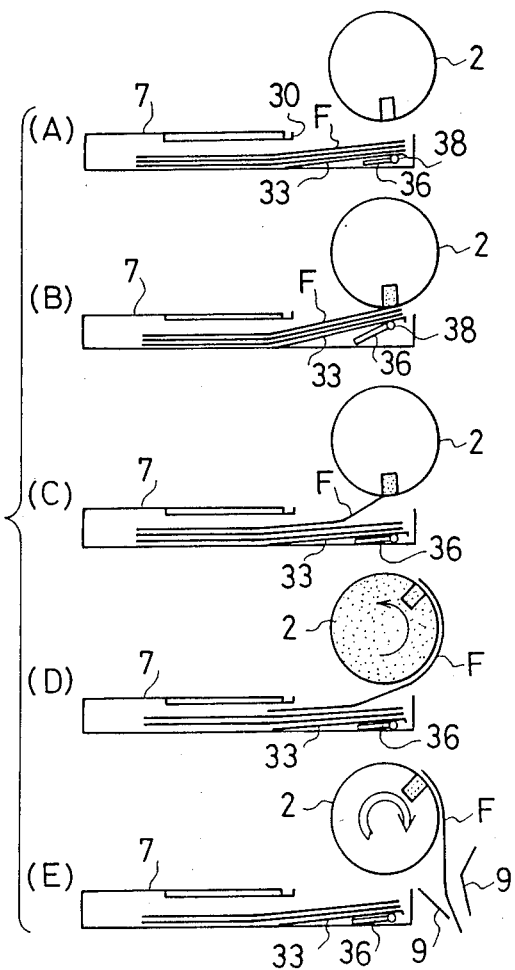
FIG. 8 is views illustrating processes of operation of the present invention.

In FIG. 8 there are schematically shown processes for applying and removing the films to and from the drum 2 of the above-described apparatus. For example, in FIG. 8(B) etc., a part of the drum 2 in the inside of which is dotted shows a zone in which vacuum suctioning is being operated. At first, in FIG. 8(A) there is shown a state of the tray 7 in which the desired number of films (F) is accommodated is being inserted into the desired position; the sliding lid 30 is being opened; and the ascending and descending plate 33 is still in a falling state. On the other hand when the film is being applied and removed, the drum 2 is stopped at a position in which the [B] zone faces downwardly, based on output pulses coming from the rotary encoder 25 provided to the axis of the drum. In FIG. 8(B) there is shown a state of the apparatus in which the motor 57 is being in operation, the arms 36 are being rotated to ascend the ascending and descending plate 33 is being ascended. By contacting the uppermost film on the films (F) with the [B] zone of the drum 2, and by operating the vacuum suctioning operation of the zone, the tip end part of the film is being suctioned and held. Then, since the film has been placed, as described above, at a constant position to the drum 2, the film is always suctioned to the constant position of the drum face.

Next, FIG. 8(C) shows a state in which the motor 57 inversely rotates, the arm 36 and the ascending and descending plate 33 descend, and all films except for those being held at the [B] zone of the drum 2 are separated from the drum 2 and are descending.

FIG. 8(D) shows a state in which vacuum suctioning operation in both the [A] and [B] zones of the drum 2 is in operation, and is rotating in a direction indicated by an arrow mark by the speed reducer. The gears 23 and 25 draw out the uppermost film from the tray 2 to wind it onto the outer circumferential surface of the drum 2. While the film wound onto the drum 2 is being scanned and exposed, in the [A] and [B] zones of the drum 2 the vacuum suctioning force is being maintained to hold the film surely.

FIG. 8(E) shows a state in which the scanning exposure has been finished, the films are taken away from the drum 2, and the film is being sent to the second tray 8 for accommodating exposed films. In this case the drum 2 is stopped at a position where the [B] zone is positioned downwardly. By releasing the vacuum suctioning operation only at the [A] zone to separate the terminal end of the film from the outer circumferential surface of the drum 2, the film is hung on the guide 9 disposed at the rear part of the frame 1. Then, by the speed reducer, the drum 2 is inversely rotated in a direction indicated by a double line arrow mark to send the film to the guide 9. Thus, the film is accommodated in the second tray 8 through the guide 10. In this case, it goes without saying that, when the drum 2 is rotated to a suitable position, the film is separated from the surface of the drum 2 by releasing the vacuum suctioning operation of the [B] zone by interrupting the vacuum source or the like. The afore-mentioned operation may be controlled by detecting the angular position of the drum 2 by counting the number of output pulses of the rotary encoder 25.

After the scanning, exposure and removal of the first film having been completed, (FIG. 8(B),) the second film is equipped, scanned and exposed, that is, processed by the same as the above-described procedures. By repeating the same procedures until all films accommodated in the first tray 7 are completely processed, no necessity of detaching the tray 7 from the frame 1 is required, so that by applying or equipping a plurality of films onto the drum 2, scanninq and exposure can be performed.

When there is no film in the tray 7, the device is operated by an output signal of the infrared rays sensor 66. For example, by operating alarming means such as an alarm lamp, a buzzer etc., the infrared rays sensor 66 announces that there is no film in the tray. Then, the tray 7 is removed from the frame 1, and new films are loaded in it in the dark room, and it is again inserted into the frame 1. In order to ensure the rate of operation of high level of the apparatus it is preferable to prepare for two trays so that while one of them is being used, the other is being in loading new films. Further, with respect to the second tray 8 for acommodating the exposed films, two trays 7 can be alternately used. A sliding lid and an automatical opening and closing means therefor similar to those of the first tray 7 also can be provided.

EFFECTS OF THE PRESENT INVENTION (1) A plurality of films previously accommodated in the tray are wound onto the drum in order, and after having been scanned and exposed, they are automatically fed to the second tray to be accommodated therein.

(2) No wasteful time is required for exchanging cassette etc. per one sheet of the films, so that nonworking time of the apparatus can be reduced, which results in improving in productivity.

(3) In the trays there are provided the light shielding lid means which automatically opens and closes, so that working in a lighted room can be performed.

(4) As it is adapted that the tip end part of the film is directly suctioned to hold it to the drum and draw out it from the tray, there is no means for driving films, such as rollers etc., so that construction is simple and installation cost is relative cheap. In addition, since there is no film driving means in the apparatus, there is no possibility of injury.

What is claimed is:

1. A film applying and removing device in a drum type picture scanning recording apparatus in which a photosensitive film is wound onto a rotational drum to be scanned and exposed by an exposing head, characterized by the following:
   a frame,
   a first tray on said frame for supporting a plurality of unexposed photosensitive films in overlapped manner, with each film having a tip end,
   a scanning drum on said frame positioned substantially over the tip ends of said films in spaced relation thereto,
   conveying means on said frame for raising and lowering the tip ends of said films with respect to said drum, and being adapted to raise selectively the tip ends of said film into contact with said drum,
   a vacuum suctioning means attached to the body of said drum to hold only the tip end of one of said films in contact with the surface of said drum,
   a drive means secured to said drum for selectively rotating said drum in opposite directions, and
   a second tray on said frame for receiving exposed films for said drum, and
   guide means on said frame for guiding said exposed films into said second tray.

2. A device according to claim 1, wherein said vacuum suctioning means attached to the body of said drum is a hollow tubular drum having a plurality of holes on the outer surface thereof, and an air-tight partition in said drum to divide the inside thereof into two zones.

3. A device according to claim 2 wherein suctioning holes in communication with one zone are more closely spaced than the suctioning holes in the other of said zones.

4. A device according to claim 2 or 3, wherein each of the zones of said drum divided by said air-tight partition is connected with a vacuum source through a rotary valve attached to the axis of the drum.

5. A device according to claims 2 or 3, further comprising a switching means to control the vacuum in each of said zones.

6. A device according to claim 1 wherein a light shielding lid is secured to said frame.

7. A device according to claim 6, wherein said light shielding lid is a sliding lid which opens or closes in engagement with a stopping means provided to the body when the tray is inserted into or extracted from the body of the apparatus.

8. A device according to claim 7, wherein said stopping means comprises a cam means which contacts with the tray to be inserted and a stopping pin to be inserted into a recessed hole bored on the shielding lid which interlocks with said cam means.

9. A device according to claim 1, wherein said conveying means comprises an ascending and descending plate hinge to the bottom of the first tray, rotating arms disposed underside of said ascending and descending plate and a driving means for rotating said rotating arms.

* * * * *